United States Patent [19]

Barwig et al.

[11] Patent Number: 5,233,607
[45] Date of Patent: Aug. 3, 1993

[54] COMMUNICATION SYSTEM FOR FORMING VIRTUAL, ANNULAR NETWORKS IN A TIME-DIVISION MULTIPLEX PACKET SWITCHING NETWORK

[75] Inventors: Karlhorst Barwig, Herrsching; Joerg Eberspaecher, Munich, both of Fed. Rep. of Germany

[73] Assignee: Siemens Aktiengesellschaft, Munich, Fed. Rep. of Germany

[21] Appl. No.: 671,886

[22] Filed: Apr. 29, 1991

[51] Int. Cl.$^5$ .................................. H04L 12/56
[52] U.S. Cl. .................................. 370/94.1; 370/60; 370/15
[58] Field of Search ............ 370/60, 61, 94.1, 56, 370/15, 85.5, 85.4, 85.15, 62, 58.1; 340/825.05; 178/2 R; 379/202

[56] References Cited

U.S. PATENT DOCUMENTS

| | | | |
|---|---|---|---|
| 4,380,810 | 4/1983 | Canniff | 370/56 |
| 4,450,554 | 5/1984 | Steensma et al. | 370/94.1 |
| 4,484,326 | 11/1984 | Turner | 370/94.1 |
| 4,486,877 | 12/1984 | Turner | 370/15 |
| 4,491,945 | 1/1985 | Turner | 370/60 |
| 4,511,759 | 4/1985 | Irlande | 178/2 R |
| 4,583,218 | 4/1986 | Ardon et al. | 370/56 |
| 4,766,590 | 8/1988 | Hamada et al. | 370/56 |
| 4,924,457 | 5/1990 | Shimizu | 370/56 |
| 5,008,882 | 4/1991 | Peterson et al. | 370/94.1 |
| 5,124,978 | 6/1992 | Chao | 370/94.1 |

OTHER PUBLICATIONS

"Design of an Integrated Services Packet Network" by J. S. Turner, IEEE Journal on Selected Areas In Communication, vol. 4, No. 8, Nov. 1986, pp. 1373–1380.
"Asynchrone Zeitvielfachubermittlung fur Breitbandnetze", by Ulrich Killat, NTZ Bd. 40, 1987, pp. 572–577.

*Primary Examiner*—Douglas W. Olms
*Assistant Examiner*—Dang Ton
*Attorney, Agent, or Firm*—Hill, Steadman & Simpson

[57] ABSTRACT

A communication method and packet switching system in which packets comprising logical addresses and voice/data information are communicated through the system by packet switching networks which are interconnected by high-speed digital trunks with each of the latter being directly terminated on both ends by trunk controllers. During initial call set-up of a particular call, central processors associated with each network in the desired route store the necessary logical to physical address information in the controllers which perform all logical to physical address translations on packets of the call. Each network comprises stages of switching nodes which are responsive to the physical address associated with a packet by a controller to communicate this packet to a designated subsequent node. The nodes provide for variable packet buffering, packet address rotation techniques, and intranode and internode signaling protocols. Each packet has a field which is automatically updated by the controllers for accumulating the total time delay incurred by the packet in progressing through the networks. Each processor has the capability of doing fault detection and isolation on the associated network, trunks, and controllers by the transmission of a single test packet. The testing is done solely in response to the test packet and no preconditioning of controllers or networks is necessary.

12 Claims, 1 Drawing Sheet

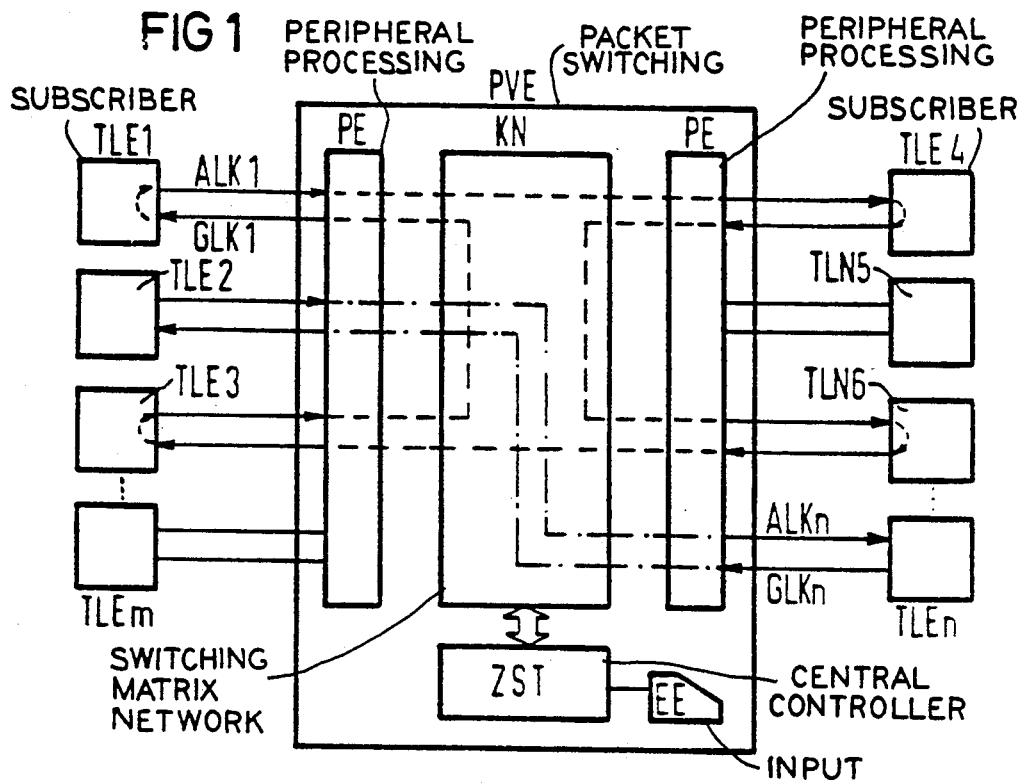
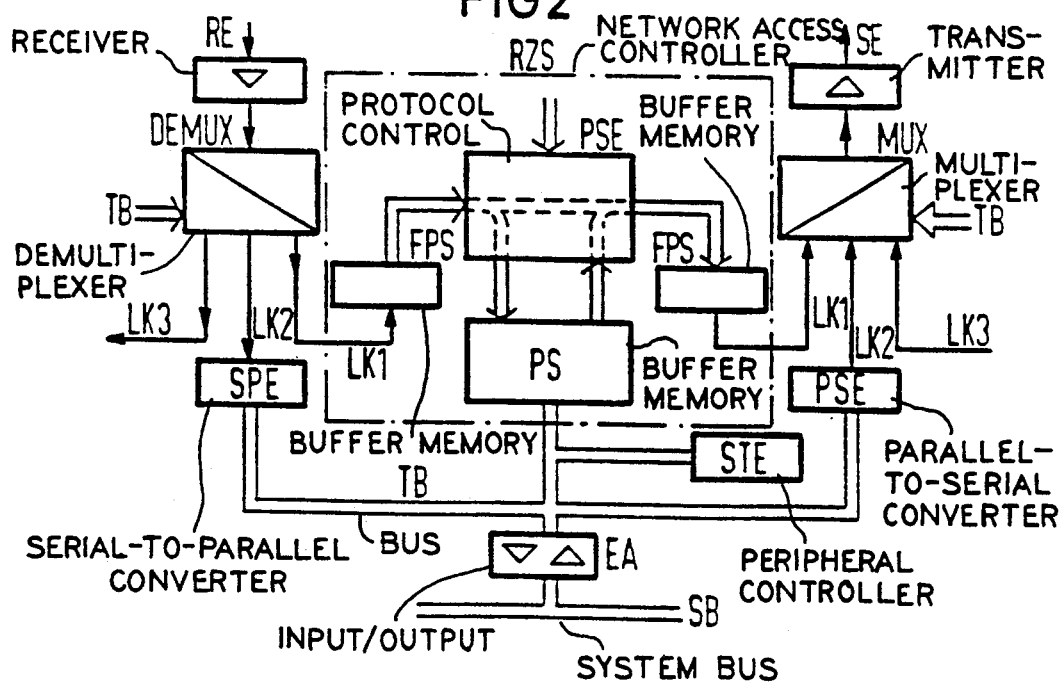

COMMUNICATION SYSTEM FOR FORMING VIRTUAL, ANNULAR NETWORKS IN A TIME-DIVISION MULTIPLEX PACKET SWITCHING NETWORK

BACKGROUND OF THE INVENTION

Packet switching equipment wherein the information packaged in packets are communicated with an asynchronous time-division multiplex transmission technique can be utilized in broadband networks or, respectively, integrated services networks. The functioning and the structure of such packet switching equipment as well as their embedding in broadband networks or integrated services networks are known, for example, from the publication "Nachrichtentechnische Zeitschrift NTZ", Vol. 40, pages 572-577, "Asynchrone Zeitvielfach-Übermittlungstechnik fuer Breitbandnetze" and from the publication "IEEE Journal on Selected Areas in Communications", Vol. 4, No. 8, (1986), pages 1373 through 1380, "Design of an Integrated Service Packet Network" as well as from U.S. Pat. No. 4,491,945. In such a packet switching network, the data of a subscriber terminal equipment connected to the packet switching equipment are fundamentally segmented in a packetizer and are provided with a header. The header at least contains information about the logic channels to be used and about the packet type. A plurality of physical connections in the subscriber line area of packet switching equipment are replaced by a plurality of logical or virtual connections as well that are referred to as logical channels. When a plurality of subscriber terminal equipment are to receive access to a subscriber line, this ensues on the basis of an asynchronous multiplexing means that, for example, can likewise be realized with a multiple access method.

The packets formed in the subscriber terminal equipment are transmitted to the packet switching means via a subscriber line means inserted between the subscriber terminal equipment and the packet switching means. All transmission methods utilized for the communication of digital information are suitable on the subscriber line, particularly for high transmission speeds. The header information are separated in the packet switching means and are interpreted by a central controller arranged in the packet switching equipment. When the communicated packet type is a connection set-up packet, then a virtual connection to the destination subscriber terminal equipment is constructed with the assistance of the destination address information recited in the message field of this packet and with the assistance of the central controller. This means that a logical or, respectively, virtual connection is set up via the switching equipment arranged in the packet switching means. The virtual connection can be conducted via further packet switching equipment beyond the packet switching equipment to which the originating subscriber terminal equipment is connected. For this purpose, a suitable call set-up procedure is to be provided between the packet switching equipment. The other packets to be communicated via a virtual connection are recognized in the packet switching equipment in accord with the information recited in the header and are communicated via the respective virtual connection.

The "asynchronous time-division multiplex transmission technique" provided for the packet switching equipment—also known as "fast packet switching", "asynchronous transfer mode, ATM" and "asynchronous time division technique, ATD"—is a matter of a packet-oriented switching method wherein the error elimination procedures and the flow control known from CCITT Recommendation X.25 are not provided. An error elimination method for the header information, however, seems meaningful. Further error-handling procedures as well as the flow control are left up to the end-to-end protocols that sequence between the subscriber terminal equipment.

It is also known to realize broadband networks on the basis of annular networks. Standardized access methods are thereby utilized to an increasing degree—particularly at high transmission speeds. Such a ring access method is represented, for example, by the standardized token access method of ANSI X3, T9.5, "fiber distributed data interface (FDDI)", token ring access control (MAC). This method assumes a ring-shaped network that is composed of serially connected subscriber terminal equipment. The information are serially communicated via the annular network in the packet mode. Each of the subscriber terminal equipment is equipped with a reception means and with a transmission means. A ring access means is inserted therebetween, the ring access procedures set forth above being realized therein. A subscriber terminal equipment accesses the annular network with the assistance of the ring access procedure.

The invention achieves the object of combining the two systems in a mutually supplementary and supporting way.

SUMMARY OF THE INVENTION

In general the present invention is a communication system for forming virtual annular networks in a time-division multiplex packet switching network. The communication system is designed such that digital information are packetized in a subscriber terminal equipment connected to a packet switching equipment that communicates according to the asynchronous time-division multiplex transmission technique and are respectively provided with an additional header placed preceding every packet. At least one information about the logical subscriber line channels respectively used and one information defining the packet type is respectively inserted into this header. Packets formed in this way are communicated via a subscriber line and with the assistance of a transmission technique to the allocated, program-controlled packet switching equipment. The information recited in the header and, given call set-up packets, the address communication communicated in the message field, are separated and are interpreted by a central controller with whose assistance at least one logical or, respectively, virtual connection is set up from the originating to the destination subscriber terminal equipment with reference to the respectively existing information, via which logical or, respectively, virtual connection the packets belonging to the respective virtual connection are subsequently communicated via a switching matrix network arranged in the packet switching equipment and, potentially, via further packet switching equipment. The packets are conducted via at least one allocated, logical channel of the appertaining subscriber line to the subscriber terminal equipment and are depacketized there. After the presence of a request information for forming at least one virtual annular network in the central controller, at least respectively one incoming logical channel from subscriber terminal equipment lines defined by the request information is coupled to at least respectively one outgoing logical channel of a subscriber terminal equipment line defined by the request information. It is coupled with this central controller and with the assistance of the switching matrix network and, potentially, with the assistance of further packet switching equipment such that the subscriber terminal equipment recited in the request information respectively form at least one virtual annular network.

After the presence of the request information, the respectively affected logical channels of the subscriber terminal equipment line in the affected subscriber terminal equipment are separated or, respectively, combined with the assistance of packet multiplexing and demultiplexing means. The outgoing and incoming logical channels provided for the formation of at least one virtual annular network are respectively coupled via a ring network access controller controlled by a peripheral controller of the subscriber terminal equipment, and are coupled for the purpose of forming a ring network. The initialization of the respective virtual annular network and the access onto the respective virtual annular network as well as the communication between the subscriber terminal equipment respectively forming a virtual annular network ensues with the assistance of ring network access procedures respectively implemented in the ring network access controller that are independent of the procedures of the packet switching equipment.

The invention essentially achieves the formation of virtual, annular networks within a packet switching network. The logic channels of the subscriber lines provided for this purpose are thereby interconnected to a virtual, annular network with the packet switching equipment at the exchange side and with the ring network access equipment at the subscriber side that are arranged in the subscriber terminal equipment. The single prerequisite for this is comprised therein that the logical channels are not connectable in pairs as in the standard point-to-point connections but are individually connectable in the switching matrix network means. The access to and the monitoring of the ring-shaped network is carried out by ring network access procedures implemented in the ring network access equipment.

A significant advantage of the invention may be seen therein that those subscriber terminal equipment that frequently communicate with one another—i.e. that heavily load the central controller of the packet switching equipment in terms of dynamics as a result of the frequent call set-up—can be interconnected to virtual, annular networks, as a result whereof the call set-up for a virtual, annular network is to be implemented once and further exchange of communications—including the call sets-up—between the subscriber terminal equipment ensues only with the assistance of the ring network access procedures of the ring network access means—i.e. without the involvement of the central controller. This means a significant reduction of the dynamic load on the central controller of a packet switching equipment.

A further significant advantage of the invention may be seen therein that the subscriber terminal equipment connected to a virtual annular network can continue to communicate with one another in the packet switching mode via the packet switching equipment in the logic channels of the subscriber lines that are still free. When a subscriber terminal equipment is formed by a plurality of subscriber devices, then, for example, the subscriber devices can respectively communicate simultaneously or in alternation via both networks—ring-shaped network and packet switching network—under the control of a peripheral controller provided in the subscriber terminal equipment.

A further advantage of the invention may be seen in the procedural independence of the virtual, annular network from the packet switching procedures. This is achieved in that the virtual, annular network—after the call set-up by the packet switching equipment—is placed in operation and monitored by the ring network access procedures implemented in the ring network access controllers and corresponding elimination measures are initiated [therein] in case of malfunction.

According to an advantageous improvement of the invention a virtual, annular network for subscriber terminal equipment that are connected to a plurality of packet switching equipment is formed, whereby the request information within the frame work of the existing set-up procedures are communicated to the further packet switching equipment. Given the lowest additional outlay—usually additional procedures realized by programs—, virtual, annular networks having subscriber terminal equipment that are connected to different packet switching equipment can be formed in this way.

According to a further, advantageous improvement of the invention, a plurality of virtual, annular networks can be formed within a packet switching equipment. For example, respectively, identical types of subscriber terminal equipment or subscriber terminal equipment having the respectively same high or, respectively, low transmission speeds are connectable to annular networks formed in this way. Respectively separate, virtual annular networks operated independently of one another can be formed for further groups of subscriber equipment selected according to the greatest variety of criteria.

Analogously thereto, a subscriber terminal equipment can be connected to a plurality of virtual annular networks. Each of these virtual annular networks is set up on the basis of a request information, being set up with the assistance of the packet switching equipment and of the subscriber terminal equipment. For the initialization, the operation and the monitoring of the respective virtual annular networks, a ring network access controller that realizes the ring network access procedure is respectively provided in the subscriber terminal equipment. These ring network access controllers are respectively in turn coordinated by a peripheral controller—usually realized in processor technique—arranged in the subscriber terminal equipment.

The addition or, respectively, removal of subscriber terminal equipment to or, respectively, from virtual annular networks can be especially advantageously implemented with the assistance of the packet switching equipment. A modify information on the basis whereof the subscriber terminal equipment to be added or, respectively, to be removed are identified is thereby to be introduced into a request information. The modify information can likewise be formed such that the terminal equipment that are to remain in the virtual annular network are recited. Due to the reconfiguring of the virtual annular network, this is disturbed, so that a protocol recovery occurs with whose assistance the virtual annular network is automatically placed in operation. As already set forth, the virtual annular networks are respectively controlled and monitored by a ring network access controller. This means that a separate ring network access controller is to be provided in the subscriber terminal equipment for each virtual annular network. The coordination in view of information flow from and to the ring access equipment within a subscriber terminal equipment is assumed by a peripheral controller usually realized in processor technique.

This extremely advantageous reconfiguring of virtual annular networks can likewise be applied given interruptions or, respectively, disturbances of virtual annular networks. After the recognition and localization of a ring network interruption or ring network disturbance, a request information wherein the disturbed subscriber terminal equipment or, respectively, ring network parts are recited is formed with the assistance of the ring network access procedure. This request information is communicated to the central controller of the respective packet switching equipment and is interpreted there. The virtual annular network is reconfigured such with the assistance of the central controller and of the switching matrix network means (switching matrix array) of the appertaining packet switching equipment that the disturbed part of the virtual annular network is removed and the remaining, intact parts form a complete, virtual annular network. Analogously thereto, the virtual annular network formed in this way can be turned back into the original configuration after a repair of the detected ring network components or, respectively, subscriber terminal equipment.

The request information can be fundamentally formed both by the input means of the packet switching equipment or in the subscriber terminal equipment. Where these request information are to be more advantageously formed is essentially dependent on administrative limitations and on the operations-oriented input possibilities in a packet switching network. For example, the formation of virtual annular networks is only allowed to be carried out by an administration (for example, by a postal administration in public networks, by the network management of the operator in private networks). On the other hand, operations-oriented inputs for the central controller of a packet switching equipment by the subscriber terminal equipment is not provided in all packet switching networks. Further, the formation of the request information in the subscriber terminal equipment involves the risk that the central controller of the packet switching equipment will be overloaded or significantly disturbed by frequent and faulty transmission of request information to said central controller. The formation of request information or, respectively, the configuring of virtual annular networks by an operations-oriented input to the packet switching equipment that is requested by the subscriber will represent the most standard method for forming request information—taking the above explanations into consideration.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a virtual annular network formed in a packet switching network with reference to a block circuit diagram; and FIG. 2 is a block circuit diagram of the components required in a subscriber terminal equipment for forming virtual annular networks.

DESCRIPTION OF THE PREFERRED EMBODIMENT

FIG. 1 shows the block circuit diagram of a packet switching equipment PVE including the subscriber equipment TLE1 ... n connected thereto. The packet switching equipment PVE is essentially formed of peripheral processing equipment PE, of a packet switching matrix network KN and of a central controller ZST. The functions and technical realizations of the individual components of the packet switching equipment PVE correspond, for example, to those of U.S. Pat. No. 4,491,945 (hereby incorporated by reference), "Fast Packet Switch". The individual subscriber terminal equipment TLE are respectively connected to a peripheral pre-processing equipment PE via a physical reception or, respectively, transmission channel. Via these physical channels, the subscriber terminal equipment TLE can communicate with the packet switching equipment PVE via a plurality of logical or, respectively, virtual channels or, respectively, connections. For this reasons, an information with which a logical channel is allocated to the packet to be currently communicated is recited in a header that precedes the respective packet in every one of the packets to be communicated. At least an information about the type of packet is also entered into the header in the subscriber terminal equipment TLE in addition to this information about the logical channels being employed. Further entries into the header such as, for example, a time particular about the output of the packet to the respective packet switching equipment PVE, are possible. Two types of packet are to be fundamentally distinguished, namely call set-up packets and message packets. A connection —a virtual connection in packet switching networks—between the originating and the destination subscriber terminal equipment is set up with the assistance of the call set-up packets in whose message field the originating and destination address are entered. Subsequently communicated message packets are communicated to the destination subscriber terminal equipment in accord with the virtual connection set up in the packet switching equipment PVE. Setting up and switching the virtual connections ensues with the assistance of the central controller and of the switching matrix array means KN.

Let it be assumed for the exemplary embodiment that a virtual annular network is to be established having the first, third, fourth and sixth subscriber terminal equipment TLN 1, 3, 4, 6. Further, the communication capacity in the virtual annular network to be formed is to be specified. This, for example, can be effected by a particular of the desired, maximum transmission speed (bit rate) provided in the call set-up packet. These information, for example, are input at an input means EE of the packet switching equipment PVE. A request information that contains the information to be input is formed in this input means EE and is communicated to the central controller ZST. By interpreting the request information in the central controller ZST, the logical channels to be employed by the subscriber terminal equipment are defined and corresponding channel numbers are entered into the respective header. With the assistance of the switching matrix array means KN, the logical channels ALK 1, 3, 4, 6 respectively incoming at the packet switching equipment are virtually connected to the logical channels GLK 1, 3, 4, 6 departing the packet switching equipment PVE such that a virtual annular network is formed—see the broken line. At the same time, the respectively outgoing logical channels GLK are virtually connected via a ring network access means to the respective, incoming logical channels ALK in the appertaining subscriber terminal equipment TLE1, 3, 4, 5 after the reception of a call set-up packet communicated from the central controller ZST. The structure and the functioning of these components of the subscriber terminal equipment TLE are set forth in greater detail in FIG. 2. The initialization of the virtual annular network formed in this way ensues on the basis of a ring network access procedure implemented in the ring network access controller. For example, this ring network access procedure can be realized by the standardized token access method according to ANSI X3.T9.5, "Fiber Distributed Data Interface (FDD) (hereby incorporated by reference)", token access control (MAC). The virtual annular network that is formed can be placed in operation, monitored and operated with the assistance of this ring network access method. The access of the individual subscriber terminal equipment TLE onto the virtual annular network is implemented by the token access method previously recited. That subscriber terminal equipment TLE that recognizes and occupies the so-called "free token" formed by the most recently accessing subscriber terminal equipment TLE thereby receives access onto the virtual annular network. For example, the information are again communicated serially in the packet mode in this virtual annular network.

By way of example, a virtual connection between the second subscriber terminal equipment TLE2 and the $n^{th}$ subscriber terminal equipment NTLN is shown by a dot-dash line. It is also thereby shown that both virtual end-to-end connections between subscriber terminal equipment—this represents the standard type of connection employed in packet switching networks—as well as virtual annular networks can be formed either simultaneously or in alternation in a packet switching equipment PVE. As already set forth, the only thing required for this are additional information in the call set-up packets already employed and an additional control method for establishing the virtual connections in the central controller ZST of the packet switching equipment PVE.

FIG. 2 shows a block circuit diagram of the components required in a subscriber terminal equipment TLE for forming a virtual annular network. Let it be assumed for the exemplary embodiment that three virtual or, respectively, logical channels can be handled in a subscriber terminal equipment TLE. Let the third virtual or, respectively, logical channel LK3 be a channel (not set forth in greater detail herein)—for example, for a voice connection—that is conducted to a further subscriber device (not shown) of a subscriber terminal equipment TLE. Further, let the second logical channel LK2 be reserved for the signaling with the network. The call set-up packets are received from the appertaining packet switching equipment PVE or communicated thereto via this second logical channel LK2. The call set-up packets that tell the subscriber terminal equipment TLE that a virtual annular network is to be formed thus proceed via this second logical channel LK2. The first logical channel LK1, for example, is provided for forming such a virtual annular network. The logical channels LK1 . . . LK3 are combined in a multiplexing means MUX and are communicated to the packet switching equipment PVE via a transmission means SE. Analogously thereto, the logical channels LK1 . . . LK3 combined by the packet switching equipment PVE are communicated to a demultiplexing means DEMUX via a reception means RE arranged in the subscriber terminal equipment TLE. In this demultiplexing means DEMUX, the logical channels LK1 . . . LK3 are separated and are separately forwarded to the appertaining devices of the subscriber terminal equipment TLE. The multiplexing or, respectively, demultiplexing method can be realized at the exchange side or, respectively, at the side of the subscriber terminal equipment, being likewise realized, for example, by an asynchronous time-division multiplex access method.

Let it be assumed for the exemplary embodiment that a request information is communicated from the packet switching equipment PVE to the subscriber terminal equipment TLE in the second logical channel LK2, the formation of a virtual annular network by the respectively first logical channel LKI being defined in this request information. The request information is conducted via a serial-to-parallel converter means SPE at an internal bus TB of the subscriber terminal equipment to a peripheral control means STE—realized by microprocessor. With the assistance of this peripheral controller STE, the multiplexing and the demultiplexing means MUX, DEMUX are correspondingly controlled or, respectively, set via the internal bus (TB) of the subscriber terminal equipment, i.e. the logical channels LK—particularly the first logical channel LK1—are provided with individual, logical channel numbers. A ring network access controller RZS is introduced between the incoming and the outgoing first logical channel LK1. Both the incoming as well as the outgoing first logical channel LKl is respectively decoupled from the following processor units by a buffer memory—realized as a FIFO buffer. A protocol control means PSE is inserted between the two buffer memories FPS. As in every ring-shaped network—particularly given a network having "token protocol"—, the protocol control means PSE is arranged in the data stream. The two first logical channels LKI are through-connected by this protocol control means PSE, i.e. the required subscriber loop for forming a virtual annular network is closed. Any access control means—MAC (medium access control) controller—can be fundamentally employed as protocol control means PSE. This, for example, is a controller for establishing a token ring network according to ANSI X3, T9.5 formed of the integrated circuits AM 79 C83, AM 79C82 and AM 79C81 of the "Advanced Micro Device" Company. A buffer memory PS is also connected to this protocol control means PSE. The transmission or, respectively, reception packets communicated via the virtual annular network are intermediately stored in this buffer memory PS for the purpose of forwarding to the annular network or to a further-processing device in the subscriber terminal equipment TLE. Complete packets of different length are always intermediately stored in this buffer memory PS. The information exchange with the further-processing devices in a subscriber terminal equipment TLE ensues via an input/output means EA via a system bus SB in an intrinsically known way.

When a plurality of virtual rings are to be simultaneously realized in a subscriber terminal equipment TLE, then the following devices must be multiply present:

multiplexing and demultiplexing means MUX, DEMUX the buffer memories FPS, PS, and the protocol control means PSE.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Communication system for forming virtual annular networks in a time-division multiplex packet switching network, comprising:

digital information packetized in subscriber terminal equipment connected to at least one packet switching equipment that communicates according to an asynchronous time-division multiplex transmission technique and respectively provided with an additional header placed preceding every packet, at least one information about logical subscriber line channels respectively used and one information defining packet type being respectively inserted into this header, packets formed in this way communicated via a subscriber line and by means of a transmission technique to the packet switching equipment wherein the information recited in the header and, given call set-up packets, an address communication communicated in a message field, are separated and are interpreted by a central controller with whose assistance at least one logical or, respectively, virtual connection is set up from an originating subscriber terminal equipment of the subscriber terminal equipment to a destination subscriber terminal equipment of the subscriber terminal equipment with reference to respectively existing information, via which logical or, respectively, virtual connection the packets belonging to a respective virtual connection are subsequently communicated via a switching matrix network arranged in the packet switching equipment and, potentially, via further packet switching equipment, whereby the packets are conducted via at least one allocated, logical channel of an appertaining subscriber line to the subscriber terminal equipment and are depacketized there, after a presence of a request information for forming at least one virtual annular network in the central controller, at least respectively one incoming logical channel from subscriber terminal equipment lines defined by the request information coupled to at least respectively one outgoing logical channel of a subscriber terminal equipment line defined by the request information, being coupled with this central controller and with the assistance of the switching matrix network and, potentially, with the assistance of further packet switching equipment such that the subscriber terminal equipment recited in the request information respectively form at least one virtual annular network, whereby, after the presence of the request information, the respectively affected logical channels of the subscriber terminal equipment line in the affected subscriber terminal equipment are separated or, respectively, combined by packet multiplexing and demultiplexing means for respectively combining and separating the incoming and outgoing logical channel and the outgoing and incoming logical channels of at least one virtual annular network are respectively coupled via a ring network access controller controlled by a peripheral controller of the subscriber terminal equipment, being coupled for the purpose of forming a ring network, and initialization of the respective virtual annular network and access onto the respective virtual annular network as well as the communication between the subscriber terminal equipment respectively forming a virtual annular network ensuing by means of ring network access procedures respectively implemented in the ring network access controller that are independent of the procedures of the packet switching equipment.

2. Communication system according to claim 1, wherein in said communication system a virtual annular network is formed for subscriber terminal equipment that are connected to a plurality of packet switching equipment, whereby the request information are communicated to the further packet switching equipments within existing call set-procedures.

3. Communication system according to claim 1, wherein in said communication system a plurality of virtual annular networks extending over at least one packet switching equipment are formed after a respective presence of a request information.

4. Communication system according to claim 1, wherein in said communication system a subscriber terminal equipment is respectively coupled with different logical channels of the subscriber line to a plurality of virtual annular networks; and wherein a ring network access controller provided with a ring network access procedure and controlled by a peripheral controller of the coupled subscriber terminal equipment is provided for every virtual annular network.

5. Communication system according to claim 1, wherein in said communication system addition or, respectively, removal of subscriber terminal equipment to, or, respectively, from virtual annular networks is undertaken after a presence of a request information containing modified information indicative of the addition or removal of subscriber terminal equipment by corresponding coupling of relevant logical channels in the respective packet switching equipment; and wherein logical addition or, respectively, removal of the subscriber terminal equipment ensues automatically with the ring network access procedure during initialization of a modified virtual annular network.

6. Communication system according to claim 1, wherein in said communication system, after a recognition of interruptions or, respectively, disturbances of virtual annular networks by respective ring network access procedures, a request information containing modified information indicative of the recognition is formed and is communicated to the central controller of the appertaining packet switching equipment that is structured such that the respective virtual annular network is reconfigured with the switching matrix network thereof such that the interrupted or, respectively, disturbed part of the virtual annular network is removed and remaining, intact parts form a virtual annular network.

7. Communication system for forming virtual annular networks in a time-division multiplex packet switching network, comprising:
   packets of digital information;
   a plurality of subscriber terminal equipment connected to at least one packet switching equipment via respective subscriber lines;
   at least one virtual annular network having at least an incoming logical channel and at least an outgoing logical channel on the subscriber line of at least one subscriber terminal equipment of the plurality of subscriber terminal equipment;
   said at least one packet switching equipment having a central controller for handling said packets coupled to a switching matrix network for forming virtual connections between at least a portion of said plurality of subscriber terminal equipments;
   each of the subscriber terminal equipment having packet multiplexing and demultiplexing means for respectively combining and separating the incoming and outgoing logical channels and connected to a ring network access controller, said ring network access controller controlled by a peripheral controller connected thereto;
   said digital information being packetized in the subscriber terminal equipment connected to the packet switching equipment that communicates according to an asynchronous time-division multiplex transmission technique and being respectively provided with an additional header placed preceding every packet, at least one information about logical channels respectively used and one information defining packet type being respectively inserted into this header;
   the packets being communicated via the subscriber line and by means of the transmission technique to the packet switching equipment wherein the information contained in the header and, given call set-up packets, an address communication communicated in a message field, are separated and are interpreted by a central controller with whose assistance at least one logical connection is set up from an originating subscriber terminal equipment of the plurality of subscriber terminal equipment to a destination subscriber terminal equipment of the plurality of subscriber terminal equipment with reference to respectively existing information, via which logical connection the packets belonging to a respective virtual connection are subsequently communicated via the switching matrix network arranged in the at least one packet switching equipment; whereby the packets are conducted via at least one allocated, logical channel of an appertaining subscriber line to the subscriber terminal equipment and are depacketized there;
   after a presence of a request information for forming at least one virtual annular network in the central controller, at least respectively one incoming signal channel from subscriber terminal equipment lines defined by the request information is coupled to at least respectively one outgoing logical channel of a subscriber terminal equipment line defined by the request information, being coupled with this central controller and with the assistance of the switching matrix network such that the subscriber terminal equipment recited in the request information respectively form at least one virtual annular network;
   whereby, after the presence of the request information, the respectively affected logical channels of the subscriber terminal equipment line in the affected subscriber terminal equipment are separated or, respectively, combined by the packet multiplexing and demultiplexing means and the outgoing and incoming logical channels of at least one virtual annular network are respectively coupled via the ring network access controller controlled by the peripheral controller of the subscriber terminal equipment, being coupled for the purpose of forming a ring network; and
   initialization of the respective virtual annular network and access onto the respective virtual annular network as well as the communication between the subscriber terminal equipment respectively forming a virtual annular network ensuing by means of ring network access procedures respectively implemented in the ring network access controller that are independent of the procedures of the packet switching equipment.

8. Communication system according to claim 7, wherein in said communication system a virtual annular network is formed for subscriber terminal equipment that are connected to a plurality of packet switching equipment, whereby the request information are communicated to the further packet switching equipment within existing call set-up procedures.

9. Communication system according to claim 7, wherein a plurality of virtual annular networks extending over at least one packet switching equipment are formed after a respective presence of a request information.

10. Communication system according to claim 7, wherein subscriber terminal equipment are respectively coupled with different logical channels of the subscriber line to a plurality of virtual annular networks; and wherein the ring network access controller provided with a ring network access procedure and controlled by a peripheral controller of the subscriber terminal equipment is provided for every virtual annular network.

11. Communication system according to claim 7, wherein the addition or removal of subscriber terminal equipment to or from virtual annular networks is undertaken after a presence of a request information containing modified information indicative of the addition or removal of subscriber terminal equipment by corresponding coupling of relevant logical channels in the respective packet switching equipment; and wherein logical addition or removal of the subscriber terminal equipment ensues automatically with the ring network access procedure during initialization of a modified virtual annular network.

12. Communication system according to claim 7, wherein after a recognition of interruptions of virtual annular networks by respective ring network access procedures, a request information containing modified information indicative of the recognition is formed and is communicated to the central controller of the appertaining packet switching equipment that is structured such that the respective virtual annular network is reconfigured such with the switching matrix network thereof that the interrupted or, respectively, disturbed part of the virtual annular network is removed and remaining, intact parts form a virtual annular network.

* * * * *